H. CUMMER.
WEIGHING SCALE.
APPLICATION FILED JULY 23, 1915.

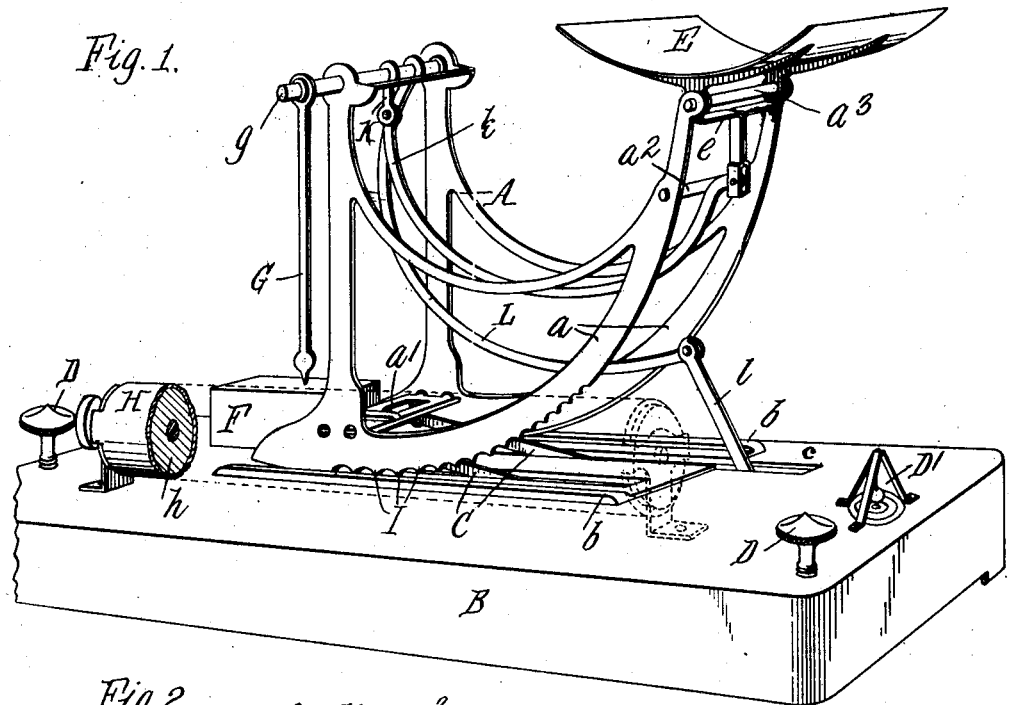
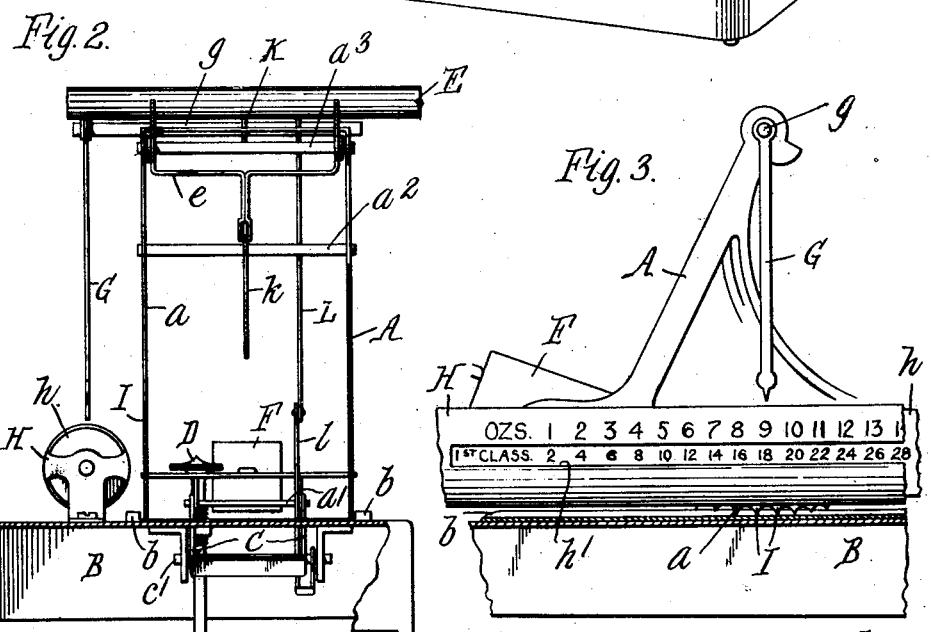

1,185,634.

Patented June 6, 1916.
3 SHEETS—SHEET 2.

Witnesses.

Inventor.
Harry Cummer,
By Wilhelm, Parker & Hard,
Attorneys.

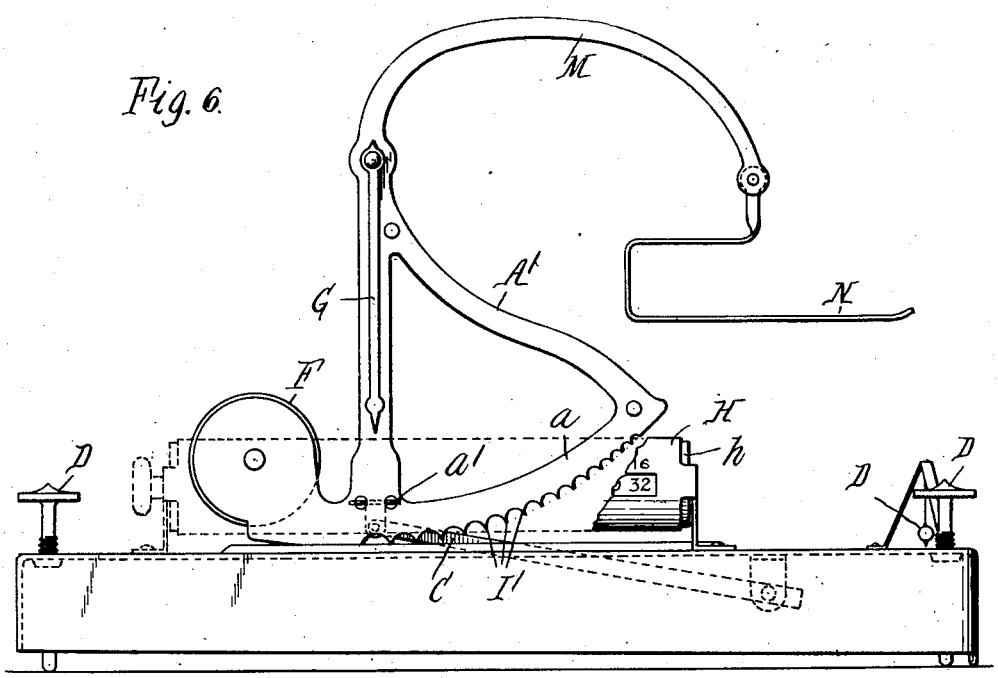

UNITED STATES PATENT OFFICE.

HARRY CUMMER, OF BUFFALO, NEW YORK.

WEIGHING-SCALE.

1,185,634.  Specification of Letters Patent.  Patented June 6, 1916.

Application filed July 23, 1915. Serial No. 41,525.

*To all whom it may concern:*

Be it known that I, HARRY CUMMER, a citizen of the United States, residing at Buffalo, in the county of Erie and State of New York, have invented a new and useful Improvement in Weighing-Scales, of which the following is a specification.

This invention relates to improvements in weighing scales of the type disclosed in Patent No. 1,076,486, granted October 21, 1913, in which the beam is of rocker form or rolls on a supporting surface.

One of the objects of the invention is to produce an efficient and accurate scale especially adapted for weighing postal matter, which is of compact, simple and inexpensive construction. The improvements are not, however, limited in application to postal scales, but are applicable to scales for weighing small articles of other character.

Another object of the invention is to provide the rocker-beam with a serrated or notched bearing edge or spaced bearing points so constructed and disposed that the beam will rock from point to point, whereby the beam will always come to rest on two adjacent points when the weight is balanced and will hold the index stationary in position to indicate the weight of the article being weighed.

According to the postal regulations a prescribed amount of postage is required for each full ounce or fraction thereof that an article weighs. Another object of the invention is to indicate this full ounce weight of an article for which postage must be paid instead of the exact weight of the article in ounces and fractions thereof, by so constructing the scale that if the article in the pan weighs a prescribed fraction of an ounce over one or more full ounces the beam will come to rest with the index indicating the next higher number of full ounces, which is the weight for which postage must be paid.

It is also an object of the invention to provide simple and practical means for retaining the rocker beam in position on its supporting base and for holding the scale pan always horizontal.

Figure 4:
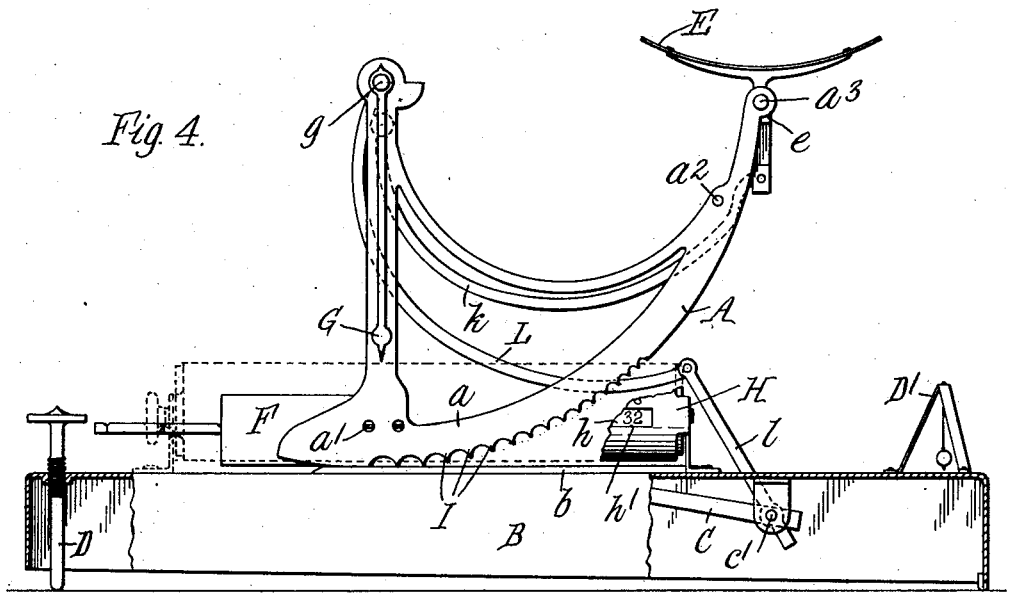
Figure 5:
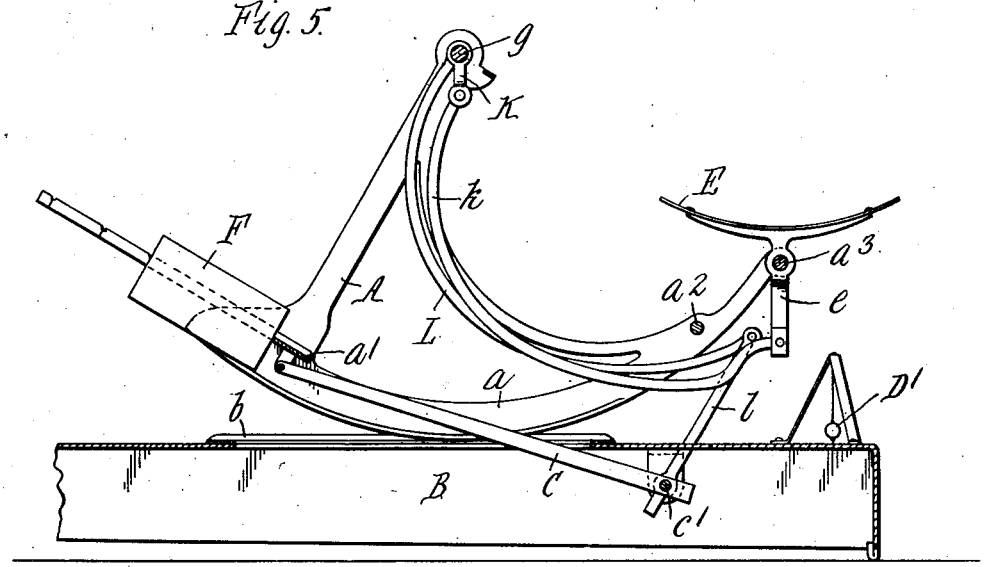

In the accompanying drawings, consisting of three sheets: Figure 1 is a perspective view of a scale embodying the invention, the indicating device being partly broken away to disclose the parts in rear thereof. Fig. 2 is a transverse sectional elevation thereof. Fig. 3 is a fragmentary side elevation of the indicating device. Fig. 4 is a side elevation of the scale partly broken away. Fig. 5 is a fragmentary longitudinal sectional elevation showing a different position thereof. Fig. 6 is a side elevation of a slightly modified construction.

Referring first to Figs. 1–5, A represents the rocker-beam, which preferably consists of a single piece of sheet metal bent to provide two parallel side pieces or rockers which have segmental curved rims $a$ and are connected by suitable cross-bars $a'$, $a^2$ and $a^3$. The beam rests and is adapted to rock on a suitable base B which, in the construction shown, is hollow and is provided on its top with parallel raised ribs $b$ between which the beam-rockers are held from lateral displacement on the base.

C represents links or rods which are pivoted at one end to the cross-bar $a'$ of the rocker-beam and pass through slots $c$ in the top of the base, being pivoted at their opposite ends in any suitable manner in the base at $c'$. These links do not interfere with the free rocking of the beam, but they tie the beam to the base so as to always retain it in proper position thereon and prevent the removal of the scale from the base. The base shown is provided with adjustable screw supports D, and a plumb-bob D', or any other suitable means for leveling the scale.

E represents the scale pan which is fulcrumed on one end of the beam by the cross-bar $a^3$ at the end of the beam passing through bearing holes in legs $e$ depending from the scale pan, or in any other suitable manner. The scale pan is counterbalanced so as to be normally held in the raised position shown in Figs. 1 and 4, by a suitable weight F which is preferably adjustable on a graduated bar to adapt the scale for weighing larger or smaller weights.

G represents an index or pointer which is suitably fulcrumed on the beam, preferably concentrically with the curved bearing edges thereof, so that as the beam rocks or rolls on the base, the index will move horizontally parallel with the base and with an indicating device which is arranged horizontally on the base for indicating the weight of the article on the pan. As shown, the index is hung on one end of a shaft $g$ which is loosely journaled in bearing holes in the beam so that the shaft and index will not rock or oscillate with the beam, but the index will retain at all times a substantially vertical position. The indicating device illustrated consists of a stationary cylindrical casing H secured to the base B, and a computing roll $h$ journaled to rotate in the casing. The casing is provided with a longitudinal slot $h'$ adjacent to which the weight indications are located, and the computing roll is provided with a plurality of rows of characters, either of which is adapted to be brought to a position to be exposed through the slot in the casing by turning the roll for indicating the amount of postage required for an article being weighed of the class designated by the exposed characters on the computing roll. Any other suitable indicating device could, however, be employed for coöperation with the index to show either or both the weight and the postage required for the articles weighed.

The periphery of one of the beam rockers is serrated or notched, as clearly shown in Figs. 1 and 4, thus providing a series of spaced bearing points I for this rocker, so that when an article is placed on the pan the beam will rock from one point to the next and will come to rest when the weight of the article is balanced on two adjacent points, whereby the beam will be prevented from oscillating back and forth and the index will be held stationary at the number indicating the weight of the article. The bearing points are so disposed that if an article weighs exactly one or more ounces the index will register that number of ounces, whereas if the article weighs a prescribed fraction of an ounce more than that many full ounces, the beam will be carried over to the next best position and the index will register the next higher number of full ounces. Thus the scale does not indicate the fraction of an ounce over one or more full ounces which an article may weigh, but instead indicates the number of full ounces for which postage must be paid, and with the indicating device described, also the exact amount of postage required for the article. Both of the beam-rockers could, if desired, be provided with the spaced bearing points, but this is not necessary and one rocker may have a plain curved bearing edge, as shown. The distances between the bearing points in the scale shown progressively decrease toward the end of the beam carrying the pan, which is necessary if the points are arranged on an arc of a circle concentric with the axis of the index, on account of the increasing leverage as the pan descends, but the spacing of the bearing points will differ, depending upon the curvature of the peripheries of the beam-rockers.

For the purpose of retaining the scale pan always in a substantially horizontal position, an arm K, fixed to the index shaft $g$, is connected by a link $k$ to the depending leg $e$ of the scale pan, and an arm L, also fixed to the index shaft $g$, is pivoted at its free end to one end of a link $l$ which is pivoted at its other end in the base B, conveniently by the same pivot employed for the links C which hold the beam in position on the base. By arranging the arms and links as shown they are located between the beam-rockers, where they are out of the way and are not liable to be struck, and they do not project beyond the ends of the beam. The scale is, therefore, materially reduced in length besides being of a more compact and desirable construction.

The scale shown in Fig. 6 operates in a similar manner to that above described, but the rocker-beam A' is provided with a gooseneck M and suspended pan N which obviates the necessity for means for retaining the pan horizontal. The beam is provided with the spaced bearing points I' and rocks from point to point in the manner explained.

I claim as my invention:

1. The combination of a supporting surface, a beam provided with spaced bearing points arranged in an arc whereby the beam is adapted to rock successively in one direction from one bearing point to the next and to come to rest on two adjacent bearing points, means connected to the beam for supporting the article to be weighed, said bearing points being disposed so that the beam will be rocked from one rest position to the next by a prescribed fraction of a unit of weight over the number of full units of weight required to rock the beam to the preceding rest position, and indicating means including a stationary member and a movable member pivoted near the center of said arc which indicates successive units of weight in successive rest positions of the beam, substantially as set forth.

2. The combination of a supporting surface, a scale beam consisting of two parallel rigidly connected members bent in an arc and adapted to rock on said supporting surface, one of said members having a smooth bearing surface and the other member being provided with spaced bearing points, whereby the beam is adapted to rock successively from one bearing point to the next and to come to rest on two successive bearing points, means connected to one end of the beam for supporting the article to be weighed, and indicating means including a member actuated by said beam, substantially as set forth.

3. The combination of a base, a rocker-beam adapted to rock on said base, a scale pan fulcrumed on one end of said beam, a shaft journaled on said beam, a pivoted connection between said scale pan and said shaft, an arm secured to said shaft and extending toward the end of the beam carrying the pan, and a connection between said arm and the base, substantially as set forth.

Witness my hand, this 7th day of July, 1915.

HARRY CUMMER.

Witnesses:
C. W. PARKER,
A. L. McGEE.